United States Patent
Nakamura et al.

(10) Patent No.: US 7,241,842 B2
(45) Date of Patent: Jul. 10, 2007

(54) CONJUGATED DIENE RUBBER, PROCESS FOR PRODUCING THE SAME, AND RUBBER COMPOSITION

(75) Inventors: Masao Nakamura, Chiyoda-ku (JP); Masaaki Komatsu, Chiyoda-ku (JP); Kouji Shouya, Chiyoda-ku (JP); Kiyonori Umetsu, Chiyoda-ku (JP); Takeshi Karato, Chiyoda-ku (JP); Takahiko Fukahori, Chiyoda-ku (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/516,070

(22) PCT Filed: Jun. 2, 2003

(86) PCT No.: PCT/JP03/06932

§ 371 (c)(1),
(2), (4) Date: Feb. 21, 2006

(87) PCT Pub. No.: WO03/102053

PCT Pub. Date: Dec. 11, 2003

(65) Prior Publication Data

US 2006/0155076 A1    Jul. 13, 2006

(30) Foreign Application Priority Data

| May 31, 2002 | (JP) | ............................... 2002-160507 |
| Aug. 1, 2002 | (JP) | ............................... 2002-224953 |
| Aug. 30, 2002 | (JP) | ............................... 2002-256234 |

(51) Int. Cl.
  *C08C 19/00* (2006.01)
  *C08F 8/00* (2006.01)

(52) U.S. Cl. ........................ 525/342; 525/100; 525/101; 526/335; 526/279

(58) Field of Classification Search ................. 525/100, 525/101, 342; 526/335, 279
See application file for complete search history.

(56) References Cited

U.S. PATENT DOCUMENTS

| 5,652,310 A | * | 7/1997 | Hsu et al. ................. 525/331.9 |
| 5,929,149 A | * | 7/1999 | Matsuo et al. ............... 524/262 |

FOREIGN PATENT DOCUMENTS

| EP | 5 20 279 | | 12/1992 |
| JP | 09-110904 | * | 4/1997 |
| JP | 09-110904 A | | 4/1997 |
| JP | 10-7702 A | | 1/1998 |
| JP | 10-316800 A | | 12/1998 |
| JP | 2000-273177 A | | 10/2000 |
| JP | 2002-80534 A | | 3/2002 |
| JP | 2003-155380 A | | 5/2003 |

* cited by examiner

*Primary Examiner*—Ling-Sui Choi
(74) *Attorney, Agent, or Firm*—Birch, Stewart, Kolasch & Birch, LLP

(57) ABSTRACT

A conjugated diene rubber obtained by a process wherein active conjugated diene polymer chains each having an active metal at a polymer chain terminal, which have been obtained by polymerizing a conjugated diene monomer alone, or a conjugated diene monomer and an aromatic vinyl monomer with the aid of an organic active metal in an inert solvent, are allowed to react with a specific polyorganosiloxane capable of reacting with the active metal bonded to the polymer chain terminal. The conjugated diene rubber contains at least 5% by weight of a structure comprising at least three conjugated diene polymer chains bonded through a polyorganosiloxane. The conjugated diene rubber gives, when silica is incorporated therein, a rubber composition having good processability and giving a crosslinked rubber having reduced heat build-up, good wet grip performance and good abrasion resistance.

18 Claims, No Drawings

CONJUGATED DIENE RUBBER, PROCESS FOR PRODUCING THE SAME, AND RUBBER COMPOSITION

TECHNICAL FIELD

This invention relates to a conjugated diene rubber, a process for producing the conjugated diene rubber, and a rubber composition. More particularly, it relates to a conjugated diene rubber giving, when silica Is incorporated therein, an uncrosslinked rubber composition having good processability, and giving a crosslinked rubber having reduced heat build-up, good wet grip performance and good abrasion resistance; a process for producing the conjugated diene rubber; and a rubber composition comprising the conjugated diene rubber.

BACKGROUND ART

In recent years, a low fuel consumption is eagerly desired for automobile tires in view of an environmental problem and a resource problem. Further, enhancements of wet grip performance and abrasion resistance are desired from viewpoints of safety and durability, respectively.

A rubber composition having silica incorporated therein exhibits reduced heat build-up as compared with a rubber composition having conventional carbon black incorporated therein. Therefore, the silica-incorporated rubber composition gives tires exhibiting a low fuel-consumption.

However, silica usually has poor affinity to carbon black, and therefore, a vulcanizable rubber composition having silica incorporated therein has poor processability and exhibits insufficiently reduced heat build-up and insufficient abrasion resistance. Therefore a silane coupling agent is usually incorporated in the rubber composition. However, even when a silane coupling agent is incorporated, the abrasion resistance is occasionally still below a satisfactory level as compared with a carbon black-incorporated rubber composition. A silane coupling agent is expensive and thus the incorporation of a large amount thereof leads to an increase in cost.

Attempts of modifying a rubber itself for enhancing its affinity for silica are being examined. For example, a rubber composition comprising a polymer rubber and silica, which rubber has been obtained by lithionizing a diene polymer rubber with an organic lithium compound and then allowing the lithionized diene polymer rubber to react with a silicon-containing compound, is described in Japanese Unexamined Patent Publication (hereinafter abbreviated to as "JP-A") No. H10-7702. A rubber composition comprising a diene polymer having a silanol group, and special carbon black particles having silica bonded to the surfaces thereof is described in JP-A H10-316800.

The above-mentioned rubber compositions comprising a modified diene polymer rubber give crosslinked rubbers exhibiting reduced heat build-up, but, uncrosslinked silica-incorporated rubber compositions thereof have poor processability and are liable to give crosslinked rubbers exhibiting poorly balanced wet grip performance and abrasion resistance.

A rubber composition comprising a polyorganosiloxane-modified diene polymer and silica is described in JP-A H9-110904, wherein the polyorganosiloxane-modified diene polymer is obtained by preparing diene polymers having an active alkali metal-bonded terminal by polymerization using an alkali metal polymerization initiator, and then, allowing the thus-prepared diene polymers to react with 0.1 to 2 moles, per mole of the alkali metal polymerization initiator used, of a polyorganosiloxane having specific functional groups. It is to be noted, however, that the factual data showing the effect of the invention have been prepared only on a modified diene polymer obtained by allowing the diene polymers to react with one mole of the polyorganosiloxane per mole of the alkali-metal polymerization initiator used.

A rubber composition comprising a silsesquioxane-modified diene polymer and silica is described in JP-A 2002-80534, wherein the silsesquioxane-modified diene polymer is obtained by preparing diene polymers having an active alkali metal-bonded terminal by polymerization using an alkali metal polymerization initiator, and then allowing the thus-prepared diene polymers to react with 0.1 to 1.5 moles, per mole of the alkali metal polymerization initiator, of a silsesquioxane compound having a polyhedron structure. It is to be noted, however, that the factual data showing the effect of the invention are given in the patent publication only on modified diene polymers obtained by allowing the diene polymers to react with 0.5 to 1.2 moles of the silsesquioxane compound per mole of the alkali-metal polymerization initiator.

The above-mentioned polyorganosiloxane-modified diene polymer and silsesquioxane-modified diene polymer give crosslinked rubbers exhibiting well-balanced reduced heat build-up and wet grip performance as compared with a dimethyldichlorosilane-modified diene polymer, but, silica-incorporated uncrosslinked rubber compositions prepared from these modified diene rubbers have poor processability and occasionally give crosslinked rubbers having poor abrasion resistance.

DISCLOSURE OF THE INVENTION

In view of the foregoing, objects of the present invention are to provide a conjugated diene rubber giving, when silica is incorporated therein, an uncrosslinked rubber composition having good processability, and giving a crosslinked rubber having sufficiently reduced heat build-up, good wet grip performance and good abrasion resistance; a process for producing the conjugated diene rubber; and a rubber composition comprising the conjugated diene rubber.

The present inventors have made extensive researches to achieve the above-mentioned objects, and found that, when silica is incorporated in a conjugated diene rubber containing a specific amount of branched conjugated diene polymers having a structure such that at least three conjugated diene polymer chains are bonded through a polyorganosiloxane, a resulting rubber composition has good processability and gives a crosslinked rubber having well reduced heat build-up, good wet grip performance and good abrasion resistance. Based on this finding, the present invention has been completed.

Thus, in one aspect of the present invention, there is provided a conjugated diene rubber containing at least 5% by weight of a structure comprising at least three conjugated diene polymer chains bonded through a polyorganosiloxane.

In another aspect of the present invention, there is provided a process for producing the above-mentioned conjugated diene rubber, characterized in that active conjugated diene polymer chains each having an active metal at a polymer chain terminal, which have been obtained by polymerizing a conjugated diene monomer alone, or a conjugated diene monomer and an aromatic vinyl monomer with the aid of an organic active metal in an inert solvent, are allowed to react with a polyorganosiloxane having 5 to 200 functional groups in the molecule which are capable of reacting with the active metal bonded to a terminal of each active conjugated diene polymer chain, wherein the amount of the polyorganosiloxane is larger than 0.001 mole and smaller than 0.1 mole, per mole of the organic active metal used for polymerization.

In still another aspect of, the present invention, there is provided a rubber composition comprising the above-mentioned conjugated diene rubber.

BEST MODE FOR CARRYING OUT THE INVENTION

The present invention will be described in detail in the following.

Conjugated Diene Rubber

The conjugated diene rubber of the present invention contains at least 5% by weight of a structure comprising at least three conjugated diene polymer chains bonded through a polyorganosiloxane.

The content of the conjugated diene polymer (hereinafter referred to as "branched conjugated diene polymer" when appropriate) having a structure comprising at least three conjugated diene polymer chains bonded through a polyorganosiloxane is at least 5% by weight, preferably in the range of 7 to 95% by weight, more preferably 10 to 90% by weight and especially preferably 15 to 85% by weight, based on the total weight of the conjugated diene rubber.

When the content of the branched conjugated diene polymer in the conjugated diene rubber is too small, an uncrosslinked rubber composition having silica incorporated therein has poor processability and gives a crosslinked rubber having poor physical properties. In contrast, a conjugated diene rubber containing a large amount of the branched conjugated diene polymer is liable to be difficult to produce.

The above-mentioned branched conjugated diene polymer preferably has a structure comprising at least four conjugated diene polymer chains bonded through a polyorganosiloxane. The content of the branched conjugated diene polymer is preferably at least 3% by weight, more preferably 5 to 90% by weight, especially preferably 7 to 85% by weight and most preferably 10 to 80% by weight, based on the total weight of the conjugated diene rubber.

The conjugated diene rubber containing the branched conjugated diene polymer having a structure comprising at least four conjugated diene polymer chains bonded through a polyorganosiloxane gives a silica-incorporated uncrosslinked rubber composition exhibiting more enhanced processability and giving a crosslinked rubber having better balanced low heat build-up, wet grip performance and abrasion resistance. However, a conjugated diene rubber containing a large amount of the branched conjugated diene polymer having a structure comprising at least four conjugated diene polymer chains bonded through a polyorganosiloxane is usually very difficult to produce.

The conjugated diene rubber of the present invention may comprise other conjugated diene polymers, in addition to the above-mentioned branched conjugated diene polymer, which include, for example, a coupled polymer having a structure comprising two conjugated diene polymer chains bonded through a polyorganosiloxane, a polyorganosiloxane-modified conjugated diene polymer having a structure comprising a conjugated diene polymer chain having a terminal to which one polyorganosiloxane has been bonded, a conjugated diene polymer having no polyorganosiloxane bonded thereto, a modified conjugated diene polymer having a structure comprising a conjugated diene polymer chain modified with a polymer terminal-modifier conventionally used in an anionic polymerization, and a coupled polymer having a structure comprising polymer chains coupled with a coupling agent conventionally used in an anionic polymerization.

The above-mentioned conjugated diene polymer chain is preferably a homopolymer chain made from a conjugated diene monomer or a copolymer chain made from a conjugated diene monomer and an aromatic vinyl monomer. More preferably the conjugated diene polymer chain is a homopolymer or copolymer chain comprising 50 to 100% by weight of conjugated diene monomer units and 50 to 0% by weight of aromatic vinyl monomer units.

In view of improved tenacity characteristics, the above-mentioned conjugated diene polymer chain is preferably a copolymer chain made from a conjugated diene monomer and an aromatic vinyl monomer, which comprises 50 to 95% by weight, more preferably 55 to 90% by weight and especially preferably 60 to 85% by weight of conjugated diene monomer units and 50 to 5% by weight, more preferably 45 to 10% by weight and especially preferably 40 to 15% by weight of aromatic vinyl monomer units.

The bonding type between conjugated diene monomer units and aromatic vinyl monomer units in the copolymer chain can be, for example, block, tapered and random. However, in view of more reduced heat build-up, a random copolymer is preferable.

The content of vinyl bond In the conjugated diene monomer units is not particularly limited, but is usually in the range of 10 to 95% by weight, preferably 20 to 90% by weight, more preferably 35 to 85% by weight and especially preferably 55 to 75% by weight. When the content of vinyl bond is relatively high, a crosslinked rubber having better balanced low heat build-up and wet grip performance can be obtained.

As specific examples of the conjugated diene monomer, there can be mentioned 1,3-butadiene, isoprene (2-methyl-1,3-butadiene), 2,3-dimethyl-1,3-butadiene, 2-chloro-1,3-butadiene and 1,3-pentadiene. Of these, 1,3-butadiene and isoprene (2-methyl-1,3-butadiene) are preferable. 1,3-Butadiene is most preferable. These conjugated diene monomers may be used either alone or as a combination of at least two thereof.

As the conjugated diene monomer, a combination of 1,3-butadiene with isoprene is preferable. More specifically a preferable conjugated diene polymer chain comprises 40 to 99.9% by weight, preferably 45 to 94.8% by weight of 1,3-butadiene units, 0.1 to 10% by weight, preferably 0.2 to 5% by weight of isoprene units, and 0 to 50% by weight, preferably 5 to 50% by weight of aromatic vinyl monomer units.

Preferably the ratio of 1,3-butadiene units to isoprene units in the preferred conjugated diene polymer chain is in the range of 99.9/0.1 to 90/10 by weight. When the ratio of 1,3-butadiene units/isoprene units is too large, low heat build-up, wet grip performance and abrasion resistance tend to be deteriorated. In contrast, when the ratio of 1,3-butadiene/isoprene is too small, low heat build-up and abrasion resistance are liable to be deteriorated.

In view of the tenacity characteristics, the above-mentioned preferred conjugated diene polymer chain comprising a combination of 1,3-butadiene units With isoprene units preferably further comprises aromatic vinyl monomer units. More specifically this preferred conjugated diene polymer chain has a composition such that the sum of 1,3-butadiene units and isoprene units is in the range of 50 to 95% by weight, more preferably 55 to 90% by weight and especially preferably 60 to 85% by weight, and the amount of aromatic vinyl monomer units is in the range of 50 to 5% by weight, more preferably 45 to 10% by weight and especially preferably 40 to 15% by weight.

The bonding type among 1,3-butadiene units, isoprene units and aromatic vinyl monomer units in the preferred polymer chain is not particularly limited and can be, for example, block, tapered or random.

The content of vinyl bond in the 1,3-butadiene units and the isoprene units (i.e., the sum of a 1,2-vinyl structure in the 1,3-butadiene units and a 1,2-vinyl structure and a 3,4-vinyl structure in the isoprene units) is not particularly limited, but is usually in the range of 10 to 95% by weight, preferably 20 to 90% by weight, more preferably 35 to 85% by weight and especially preferably 55 to 75% by weight. When the content of vinyl bond is relatively high, a crosslinked rubber having better balanced low heat build-up and wet grip performance can be obtained.

As specific examples of the aromatic vinyl monomer, there can be mentioned styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, 4-t-butoxystyrene, monochlorostyrene, dichlorostyrene, monofluorostyrene, dimethylaminomethylstyrene and dimethylaminoethylstyrene. Of these, styrene is preferable. These aromatic vinyl monomers may be used either alone or as a combination of at least two thereof.

The above-mentioned conjugated diene polymer chain can comprise other monomer units, in addition to the conjugated diene units (i.e., 1,3-butadiene units and isoprene units) and the aromatic vinyl monomer units, provided that the effect of the invention can be substantially obtained.

As specific examples of the other monomer units, there can be mentioned units derived from conjugated diene monomers, other than 1,3-butadiene and isoprene, such as 2,3-dimethyl-1,3-butadiene, 2-chloro-1,3-butadiene and 1,3-pentadiene; ethylenically unsaturated carboxylic acid ester monomers such as isopropyl acrylate, isopropyl methacrylate, n-butyl acrylate, n-butyl methacrylate, t-butyl acrylate and t-butyl methacrylate; olefin monomers such as ethylene, propylene, isobutylene and vinylcyclohexane; and non-conjugated diene monomers such as 1,4-pentadiene and 1,4-hexadiene. The amount of these optional monomer units is preferably not larger than 10% by weight, more preferably not larger than 5% by weight.

The above-mentioned branched conjugated diene polymer has a structure comprising at least three conjugated diene polymer chains bonded through a polyorganosiloxane. The polyorganosiloxane is not particularly limited provided that it has 5 to 200 functional groups in the molecule, which are capable of reacting with an active metal bonded to a terminal of each active conjugated diene polymer chain.

As specific examples of the functional groups, there can be mentioned an epoxy group, an alkoxyl group, an aryloxy group, a vinyl group, a pyrrolidonyl group, a carbonyl group and a halogen. Of these, an epoxy group, an alkoxyl group and a pyrrolidonyl group are preferable. An epoxy group is especially preferable.

The number of functional groups in the polyorganosiloxane molecule is in the range of 5 to 200, preferably 20 to 150 and more preferably 30 to 120. If the number of functional groups is too small, the branched conjugated diene polymer is difficult to produce, and the effect of the present invention cannot be obtained. In contrast, if the number of functional groups is too large, the polyorganosiloxane is difficult to produce and the polyorganosiloxane has too high viscosity and its handling becomes difficult.

The above-mentioned conjugated diene polymer preferably has a structure comprising at least three conjugated diene polymer chains are bonded through a polyorganosiloxane represented by the following general formula (1). General formula (1):

General formula (1):

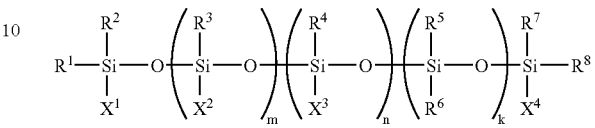

wherein $R^1$ through $R^8$ represent an alkyl group having 1 to 6 carbon atoms or an aryl group having 6 to 12 carbon atoms, and $R^1$ through $R^8$ may be the same or different. $X^1$ and $X^4$ are either (i) such that a part of the plural $X^1$ and a part of the plural $X^4$ are a group selected from alkoxyl groups having 1 to 5 carbon atoms, hydrocarbon groups containing a 2-pyrrolidonyl group, and groups with 4 to 12 carbon atoms containing an epoxy group, and the remainder of the plural $X^1$ and the remainder of the plural $X^4$ are a group derived from these groups or are a single bond, or (ii) an alkyl group having 1 to 6 carbon atoms or an aryl group having 6 to 12 carbon atoms; and $X^1$ and $X^4$ may be the same or different. $X^2$ is a group such that a part of the plural $X^2$ is a group selected from alkoxyl groups having 1 to 5 carbon atoms, hydrocarbon groups containing a 2-pyrrolidonyl group, and groups with 4 to 12 carbon atoms containing an epoxy group, and the remainder of the plural $X^2$ is a group derived from these groups or is a single bond. $X^3$ is a group comprising 2 to 20 alkylene glycol repeating units, and a part of the plural $X^2$ may be a group derived from a group comprising 2 to 20 alkylene glycol repeating units. m is an integer in the range of 3 to 200, n is an integer in the range of 0 to 200, and k is an integer in the range of 0 to 200.

As specific examples of the alkyl group having 1 to 6 carbon atoms constituting $R^1$ through $R^8$, $X^1$ and $X^4$, there can be mentioned a methyl group, an ethyl group, a n-propyl group, an isopropyl group, a butyl group, a pentyl group, a hexyl group and a cyclohexyl group. As specific examples of the aryl group having 6 to 12 carbon atoms, there can be mentioned a phenyl group and a methylphenyl group. Of these alkyl groups and aryl groups, a methyl group is especially preferable.

As specific examples of the alkoxyl group having 1 to 5 carbon atoms constituting $X^1$, $X^2$ and $X^4$, there can be mentioned a methoxy group, an ethoxy group, a propoxy group, an isopropoxy group and a butoxy group. Of these, a methoxy group is preferable.

As a preferable example of the hydrocarbon group containing a 2-pyrrolidonyl group, there can be mentioned a group represented by the following general formula (6).

General formula (6):

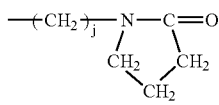

wherein j is an integer in the range of 2 to 10. j is especially preferably 2.

As an example of the group containing with 4 to 12 carbon atoms containing an epoxy group there can be mentioned a group represented by the following general formula (7). General formula (7):

-Z-Y-E wherein Z is an alkylene or alkylarylene group having 1 to 10 carbon atoms, Y is a methylene group, a sulfur atom or an oxygen atom, and E is a hydrocarbon group with 2 to 10 carbon atoms containing an epoxy group. Of these, a group wherein Y Is an oxygen atom is preferable. A group wherein Y is an oxygen atom and E is a glycidyl group is more preferable. A group wherein Z is an alkylene group having three carbon atoms, Y is an oxygen atom and E is a glycidyl group is especially preferable.

By the phrase "a group derived from these groups (i.e, a group derived from alkoxyl groups having 1 to 5 carbon atoms, hydrocarbon groups containing a 2-pyrrolidonyl group, and groups with 4 to 12 carbon atoms containing an epoxy group)" as used herein, we mean a residue formed from the above-recited groups of polyorganosiloxane by the reaction of these groups with active conjugated diene polymer chains each having an active metal at a terminal thereof when the active conjugated diene polymer chain are allowed to react with the polyorganosiloxane having the above-recited groups. Such group derived from the above-recited groups will be explained below.

In the case when a part of the plural $X^1$ and/or a part of the plural $X^4$ are a group selected from alkoxyl groups having 1 to 5 carbon atoms, hydrocarbon groups containing a 2-pyrrolidonyl group, and groups with 4 to 12 carbon atoms containing an epoxy group, the remainder of the plural $X^1$ and/or the remainder of the plural $X^4$ are a group derived from these groups or are a single bond. $X^2$ is a group such that a part of the plural $X^2$ is a group selected from alkoxyl groups having 1 to 5 carbon atoms, hydrocarbon groups containing a 2-pyrrolidonyl group, and groups with 4 to 12 carbon atoms containing an epoxy group, and the remainder of the plural $X^2$ is a group derived from these groups or is a single bond.

In a polyorganosiloxane represented by the general formula (2), shown below, before the reaction with active conjugated diene polymer chains, in the case when at least part of $X^5$, $X^6$ and $X^8$ are an alkoxyl group having 1 to 5 carbon atoms, when the polyorganosiloxane is allowed to react with active conjugated diene polymer chains, a bond between an oxygen atom of each alkoxyl group and a silicon atom to which the alkoxyl group is bonded is cleaved, and each active conjugated diene polymer chain is directly bonded to the silicon atom (thus, $X^5$, $X^6$ and $X^8$ are converted to single bond). That is, a polyorganosiloxane represented by the general formula (1) after the reaction with active conjugated diene polymer chains, at least part of $X^1$, $X^2$ and $X^4$ are single bond.

In a polyorganosiloxane represented by the general formula (2), shown below, before the reaction with active conjugated diene polymer chains, in the case when at least part of $X^5$, $X^6$ and $X^8$ are a hydrocarbon group containing a 2-pyrrolidonyl group, when the polyorganosiloxane is allowed to react with active conjugated diene polymer chains, a carbon-oxygen bond in a carbonyl group constituting the 2-pyrrolidonyl group is cleaved, and each active conjugated diene polymer chain is directly bonded to the carbon atom of cleaved carbon-oxygen bond.

In a polyorganosiloxane represented by the general formula (2), shown below, before the reaction with active conjugated diene polymer chains, in the case when at least part of $X^5$, $X^6$ and $X^8$ are a hydrocarbon group with 4 to 12 carbon atoms containing an epoxy group, when the polyorganosiloxane is allowed to react with active conjugated diene polymer chains, a carbon-oxygen bond in an epoxy ring of the epoxy group is cleaved, and each active conjugated diene polymer chain is directly bonded to the carbon atom of cleaved carbon-oxygen bond.

In the polyorganosiloxane of general formula (1), $X^1$ and $X^4$ are preferably such that a part of the plural $X^1$ and a part of the plural $X^4$ are a hydrocarbon group with 4 to 12 carbon atoms containing an epoxy group, and the remainder of the plural $X^1$ and the remainder of the plural $X^4$ are a group derived from the epoxy group-containing hydrocarbon group, or $X^1$ and $X^4$ are preferably an alkyl group having 1 to 6 carbon atoms. $X^2$ is preferably such that a part of the plural $X^2$ is a hydrocarbon group with 4 to 12 carbon atoms containing an epoxy group, and the remainder of the plural $X^2$ is a group derived from the epoxy group-containing hydrocarbon group.

In the poloyorganosiloxane of general formula (1), $X^3$, namely, a group comprising 2 to 20 alkylene glycol repeating units, preferably includes a group represented by the following general formula (8).

General formula (8):

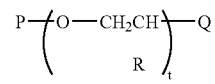

wherein t is an integer in the range of 2 to 20; P is an alkylene group or alkylarylene group having 2 to 10 carbon atoms; R is a hydrogen atom or a methyl group; and Q is an alkoxyl or aryloxy group having 1 to 10 carbon atoms. A part of Q may be a single bond. Of these, t is preferably in the range of 2 to 8, P is preferably an alkylene group having 3 carbon atoms, R is preferably a hydrogen atom and Q is preferably a methoxy group.

m is an integer in the range of 3 to 200, preferably 20 to 150 and more preferably 30 to 120. If m is too small, a silica-incorporated uncrosslinked conjugated diene rubber composition is liable to have poor processability and give a crosslinked rubber having poor balance between abrasion resistance and low heat build-up. In contrast, if m is too large, the polyorganosiloxane having such a large m is difficult to produce and the polyorganosiloxane has too high viscosity to easily handle.

Among the polyoganosiloxanes represented by the above-mentioned general formula (1), those which are represented by the following general formula (3) are preferable.

General formula (3):

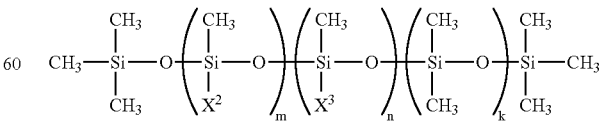

wherein $X^2$ is a group selected from alkoxyl groups having 1 to 5 carbon atoms, hydrocarbon groups containing a 2-pyrrolidonyl group, and groups with 4 to 12 carbon atoms containing an epoxy group; $X^3$ is a group comprising 2 to 20 alkylene glycol repeating units; and m is an integer in the range of 5 to 200, n is an integer in the range of 0 to 200, and k is an integer in the range of 0 to 200.

In the general formula (3), m is an integer in the range of 5 to 200, preferably 20 to 150 and more preferably 30 to 120. n is an integer in the range of 0 to 200, preferably 0 to 150 and more preferably 0 to 120. k is an integer in the range of 0 to 200, preferably 0 to 150 and more preferably 0 to 120.

The sum of integers m, n and k is preferably not larger than 400, more preferably not larger than 300 and especially preferably not larger than 250. When the sum of m, n and k is too large, the polyorganosiloxane is difficult to produce and has too high viscosity to easily handle.

As specific examples of the alkoxyl group having 1 to 5 carbon atoms, there can be mentioned a methoxy group, an ethoxy group, a propoxy group, an isopropoxy group and a butoxy group. Of these, a methoxy group is preferable.

The hydrocarbon group containing a 2-pyrrolidonyl group preferably includes those which are represented by the above-mentioned general formula (6). The group with 4 to 12 carbon atoms containing an epoxy group preferably includes those which are represented by the above-mentioned general formula (7).

In the poloyorganosiloxane of general formula (3), $X^3$, namely, a group comprising 2 to 20 alkylene glycol repeating units, preferably includes a group represented by the above-mentioned general formula (8).

Among the polyorganosiloxanes of general formula (1), compounds represented by the following general formula (4) are also preferable.

General formula (4):

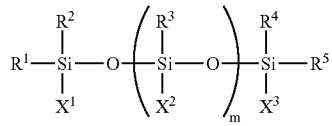

wherein $R^1$ through $R^5$ represent an alkyl group having 1 to 6 carbon atoms or an aryl group having 6 to 12 carbon atoms, and $R^1$ through $R^6$ may be the same or different; $X^1$ through $X^3$ are a group selected from alkoxyl groups having 1 to 5 carbon atoms, hydrocarbon groups containing a 2-pyrrolidonyl group, groups with 4 to 12 carbon atoms containing an epoxy group, and groups Q derived from these groups, and at least part of $X^1$ through $X^3$ are the groups Q; $X^1$ through $X^3$ may be the same or different; and m is an integer in the range of 3 to 200.

As specific examples of the alkyl group having 1 to 6 carbon atoms, there can be mentioned a methyl group, an ethyl group, a n-propyl group, an isopropyl group, a butyl group, a pentyl group, a hexyl group and a cyclohexyl group. As specific examples of the aryl group having 6 to 12 carbon atoms, there can be mentioned a phenyl group and a methylphenyl group. Of the groups for $R^1$ through $R^5$, a methyl group is preferable.

As specific examples of the alkoxyl group having 1 to 5 carbon atoms, there can be mentioned a methoxy group, an ethoxy group, a n-propoxy group, an isopropoxy group and a butoxy group. Of these, a methoxy group is preferable.

The hydrocarbon groups containing a 2-pyrrolidonyl group preferably include groups represented by the above-mentioned general formula (6). The groups with 4 to 12 carbon atoms containing an epoxy group preferably include groups represented by the above-mentioned general formula (7).

By the phrase "group Q derived from alkoxyl groups having 1 to 5 carbon atoms, hydrocarbon groups containing a 2-pyrrolidonyl group, and groups with 4 to 12 carbon atoms containing an epoxy group" as used herein, we mean a residue formed from the above-recited groups of polyorganosiloxane by the reaction of these groups with active conjugated diene polymer chains each having an active metal bonded to a terminal thereof when the active conjugated diene polymer chains are allowed to react with the polyorganosiloxane having the above-recited groups. Such group derived from the above-recited groups will be explained below. Parts of $X^1$ through $X^3$ in the general formula (4) are the group Q.

In a polyorganosiloxane represented by the general formula (5), shown in claim 15, before the reaction with active conjugated diene polymer chains, in the case when at least part of $X^4$ through $X^6$ are an alkoxyl group having 1 to 5 carbon atoms, when the polyorganosiloxane is allowed to react with an active conjugated diene polymer chain, a bond between an oxygen atom of each alkoxyl group and a silicon atom to which the alkoxyl group is bonded is cleaved, and each active conjugated diene polymer chain is directly bonded to the silicon atom (thus, Q in the general formula (4) after the reaction is a single bond).

In a polyorganosiloxane of formula (5) before the reaction, in the case when at least part of $X^4$ through $X^6$ are a hydrocarbon group containing a 2-pyrrolidonyl group, when the polyorganosiloxane is allowed to react with active conjugated diene polymer chains, a carbon-oxygen bond in a carbonyl group constituting the 2-pyrrolidonyl group is cleaved, and each active conjugated diene polymer chain is directly bonded to the carbon atom of cleaved carbon-oxygen bond.

In a polyorganosiloxane of formula (5) before the reaction, in the case when at least part of $X^4$ through $X^6$ are a hydrocarbon group with 4 to 12 carbon atoms containing an epoxy group, when polyorganosiloxane is allowed to react with active conjugated diene polymer chains, a carbon-oxygen bond in an epoxy ring of the epoxy group is cleaved, and each active conjugated diene polymer chain is directly bonded to the carbon atom of cleaved carbon-oxygen bond.

Among the above-recited groups representing $X^4$ through $X^6$, a group with 4 to 12 carbon atoms containing an epoxy group is preferable, thus, $X^1$ through $X^3$ in formula (1) being preferably partly said epoxy group-containing group and partly a group derived from said epoxy group-containing group.

m is an Integer in the range of 3 to 200, preferably 20 to 150 and more preferably 30 to 120. If m is too small, a silica-incorporated uncrosslinked conjugated diene rubber composition is liable to have poor processability and gives a crosslinked rubber having poor balance between abrasion resistance and low heat build-up. In contrast, if m is too large, the polyorganosiloxane having such a large m is difficult to produce and the polyorganosiloxane has too high viscosity to easily handle.

The conjugated diene rubber of the present invention usually has a Mooney viscosity ($ML_{1+4}$, 100° C.) in the range of 5 to 200, preferably 20 to 180, more preferably 25 to 150, especially preferably 35 to 130 and most preferably 35 to 90. If the Mooney viscosity is too low, a crosslinked rubber is liable to exhibit relatively high heat build-up. In contrast, if the Mooney viscosity is too high, it Is often difficult to incorporate silica in a conjugated diene rubber to obtain a uniform rubber composition, and a silica-incorporated uncrosslinked rubber composition is liable to have poor processability.

Process for Producing Conjugated Diene Rubber

The conjugated diene rubber of the present invention is obtained by a process wherein, active conjugated diene polymer chains each having an active metal at a polymer chain terminal, which have been obtained by polymerizing a conjugated diene monomer alone, or a conjugated diene monomer and an aromatic vinyl monomer with the aid of an organic active metal in an inert solvent, are allowed to react with a polyorganosiloxane having 5 to 200 functional groups in the molecule which are capable of reacting with the active metal bonded to a terminal of each active conjugated diene polymer chain, wherein the amount of the polyorganosiloxane is larger than 0.001 mole but smaller than 0.1 mole, per mole of the organic active metal used in the polymerization.

As the aromatic vinyl monomer used, those which are recited above can be mentioned.

Monomers other than a conjugated diene monomer and an aromatic vinyl monomer can be copolymerized provided that the effect of the present invention can be obtained. As specific examples of the optional monomers, those which are recited above are mentioned.

The relative amounts of a conjugated diene monomer, an optional aromatic vinyl monomer and optional other monomers are the same as those which are mentioned above with regard to the respective monomer units for constituting the conjugated diene polymer chains.

No limitation is imposed to the kind of inert solvent used provided that the inert solvent can usually be used in a solution polymerization and a polymerization reaction is not badly influenced. As specific examples of the inert solvent, there can be mentioned aliphatic hydrocarbons such as butane, pentane, hexane and 2-butene; alicyclic hydrocarbons such as cyclopentane, cyclohexane and cyclohexene; and aromatic hydrocarbons such as benzene, toluene and xylene. The amount of inert solvent is such that a concentration of the monomers is usually in the range of 1 to 50% by weight, preferably 10 to 40% by weight.

The organic active metal used preferably includes organo-alkali metal compounds, and, as specific examples thereof, there can be mentioned organo-monolithium compounds such as n-butyllithium, sec-butyllithium, t-butyllithium, hexyllithium, phenyllithium and stilbenelithium; organo-polyvalent lithium compounds such as dilithlomethane, 1,4-dilithiobutane, 1,4-dilithio-2-ethyloyclohexane and 1,3,5-trilithiobenzene; organosodium compounds such as sodium naphthalene; and organopotassium compounds such as potassium naphthalene. Of these, organolithium compounds are preferable. Organo-monolithium compounds are especially preferable. The organo-alkali metal compounds can be used as organo-alkali metal amide compounds which are prepared by allowing an organo-alkali metal compound to react with a secondary amine such as dibutylamine, dihexylamine or dibenzylamine prior to the use for polymerization. The organic active metal may be used either alone or as a combination of at least two thereof.

The amount of the organic active metal used is preferably in the range of 1 to 50 milli-mole, more preferably 2 to 20 milli-mole, per 1,000 g of the monomer mixture.

When the polymerization Is carried out, a polar compound is preferably added to the monomers for controlling the content of vinyl bond in the conjugated diene monomer units in the conjugated diene rubber, to the desired extent. As specific examples of the polar compound, there can be mentioned ether compound such as dibutyl ether and tetrahydrofuran; tertiary amines such as tetramethylethylenediamine; alkali metal alkoxides; and phosphine compounds. Of these, ether compounds and tertiary amines are preferable. Tertiary amines are especially preferable. Tetramethylethylenediamine Is most preferable. The amount of polar compound is preferably in the range of 0.01 to 100 moles, more preferably 0.3 to 30 moles, per mole of the organic active metal. When the amount of polar compound is in this range, the content of vinyl bond in the conjugated diene monomer units can easily be controlled and any trouble due to the deactivation of a catalyst does not occur or occurs only to a lesser extent.

In the case when a conjugated diene monomer is copolymerized with an aromatic vinyl monomer, the conjugated diene monomer alone or a mixture of the conjugated diene monomer with the aromatic vinyl monomer is preferably fed to a polymerization mixture in a continuous or intermittent manner to maintain the ratio of the aromatic vinyl monomer to the total of the conjugated diene monomer and the aromatic vinyl monomer in a specific range for enhancing the randomness of bond between the conjugated diene monomer units and the aromatic vinyl monomer units in the conjugated diene rubber.

In the case when 1,3-butadiene, isoprene and an optional aromatic vinyl monomer are copolymerized with the aid of an organic active metal in an inert organic solvent, the following polymerization procedure is preferably adopted, which comprises the steps of;

polymerizing a monomer mixture comprising at least 80% by weight of the amount of 1,3-butadiene used for polymerization, not larger than 80% by weight of the amount of isoprene used for polymerization, and at least 80% by weight of the amount of the optional aromatic vinyl monomer used for polymerization;

adding the remainder of the amount of isoprene, followed by polymerization; and then, adding the remainder of the amount of 1,3-butadiene and the remainder of the amount of the optional aromatic vinyl monomer, followed by polymerization. The thus-obtained conjugated dione rubber gives a silica-incorporated uncrosslinked rubber composition exhibiting more enhanced processability and giving a crosslinked rubber having better balanced low heat build-up, wet grip performance and abrasion resistance.

The polymerization temperature is usually in the range of −78 to 150° C., preferably 0 to 100° C. and more preferably 30 to 90° C.

The polymerization manner may be any of batchwise, continuous and other manners. In view of ease in controllability of randomness of bond between the conjugated diene monomer units and the aromatic vinyl monomer units, a batchwise polymerization manner is preferable.

In the process for producing a conjugated diene rubber according to the present Invention, the active conjugated diene polymer chains each having an active metal at a polymer chain terminal, which have been obtained by the above-mentioned procedures, are allowed to react with a polyorganosiloxane having 5 to 200 functional groups in the molecule which are capable of reacting with the active metal bonded to a terminal of each active conjugated diene polymer chain, wherein the amount of the polyorganosiloxane is larger than 0.001 mole but smaller than 0.1 mole, per mole of the organic active metal used in the polymerization.

As the polyorganosiloxane, a polyorganosiloxane represented by the following general formula (2) is preferably used for producing polymer chains bonded through a polyorganosiloxane represented by the above-mentioned general formula (1).

General formula (2):

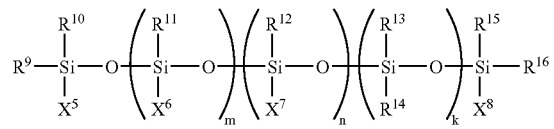

wherein $R^9$ through $R^{16}$ represent an alkyl group having 1 to 6 carbon atoms or an aryl group having 6 to 12 carbon atoms, and $R^9$ through $R^{16}$ may be the same or different. $X^5$ and $X^8$ are a group selected from alkyl groups having 1 to 6 carbon atoms, aryl groups having 6 to 12 carbon atoms, alkoxyl groups having 1 to 5 carbon atoms, hydrocarbon groups containing a 2-pyrrolidonyl group, and groups with 4 to 12 carbon atoms containing an epoxy group, and $X^5$ and $X^8$ may be the same or different. $X^6$ is a group selected from alkoxyl groups having 1 to 5 carbon atoms, hydrocarbon groups containing a 2-pyrrolidonyl group, and groups with 4 to 12 carbon atoms containing an epoxy group. $X^7$ is a group comprising 2 to 20 alkylene glycol repeating units. m is an integer in the range of 3 to 200, n is an integer in the range of 0 to 200, and k is an integer in the range of 0 to 200.

As specific examples of the alkyl group having 1 to 6 carbon atoms constituting $R^9$ through $R^{16}$, $X^5$ and $X^8$, there can be mentioned a methyl group, an ethyl group, a n-propyl group, an isopropyl group, a butyl group, a pentyl group, a hexyl group and a cyclohexyl group. Of these alkyl groups, a methyl group is preferable. As specific examples of the aryl group having 6 to 12 carbon atoms, there can be mentioned a phenyl group and a methylphenyl group.

As specific examples of the alkoxyl group having 1 to 5 carbon atoms constituting $X^5$, $X^6$ and $X^8$, there can be mentioned a methoxy group, an ethoxy group, a propoxy group, an isopropoxy group and a butoxy group. Of these, a methoxy group is preferable.

As a preferable example of the hydrocarbon group containing a 2-pyrrolidonyl group, there can be mentioned a group represented by the above-mentioned general formula (6).

As a preferable example of the group with 4 to 12 carbon atoms containing an epoxy group, there can be mentioned a group represented by the above-mentioned general formula (7).

As $X^5$, $X^6$ and $X^8$ in formula (2), a group with 1 to 12 carbon atoms containing an epoxy group is preferable among the above-recited groups.

As $X^7$, i.e., a group comprising 2 to 20 alkylene glycol repeating units in formula (2), a group represented by the above-mentioned general formula (8) is preferable.

Conjugated diene rubbers wherein conjugated diene polymer chains are bonded through a polyorganosiloxane represented by the formula (3) or (4) can be produced by using a polyorganosiloxane presented by the formula (3) or (4), respectively.

The above-mentioned polyorganosiloxane used can be prepared, for example, by a procedure described in Fourth Edition Jikken Kagaku Kouza (Lecture on Chemical Experiments), vol. 28, edited by Chemical Society of Japan, and literatures cited in this publication, or commercially available polyorganosiloxanes can also be used.

The amount of the above-mentioned polyorganosiloxane used is larger than 0.001 mole but smaller than 0.1 mole, preferably larger than 0.005 mole but smaller than 0.09 mole, and more preferably larger than 0.01 mole but smaller than 0.08 mole, per mole of the organic active metal used for polymerization. When the amount of the polyorganosiloxane is larger than or smaller than this range, a silica-incorporated uncrosslinked rubber composition tends to have poor processability, and a crosslinked rubber has poorly balanced abrasion resistance and low heat build up.

It is preferable that the polyorganosiloxane is added, as a solution in the inert solvent used for polymerization, to a polymerization mixture. This is because the polyorganosiloxane can easily and uniformly react with the active metal bonded to a terminal of each active conjugated diene polymer chain. The concentration of polyorganosiloxane in the solution is preferably in the range of 1 to 50% by weight.

It is preferable that the polyorganosiloxane is allowed to react with the active conjugated diene polymer chains at a time or after a time when the polymerization reaction has been substantially completed, more preferably after a time when the polymerization reaction has been substantially completed but before the active conjugated diene polymer chains have been gelled by side reactions.

Prior to the reaction of the polyorganosiloxane with the active conjugated diene polymer chains, a polymerization stopper, a polymer chain terminal-modifier, and/or a coupling agent, which are conventionally used in an anion polymerization, can be incorporated in a polymerization mixture to deactivate a part of the active metal bonded to a terminal of each conjugated diene polymer.

The reaction of the polyorganosiloxane with he active conjugated diene polymer chains is carried out usually at a temperature in the range of 0 to 100° C., preferably 30 to 90° C. and usually for a time in the range of 1 to 100 minutes, preferably 2 to 60 minutes.

After the reaction of the polyorganosiloxane with the active conjugated diene polymer chains, a polymerization stopper such as an alcohol, e.g., methanol or isopropanol, or water is added to stop the reaction to obtain a polymer solution.

In the case when a part of the unreacted conjugated diene polymer chains remain unreacted even after the reaction of the polyorganosiloxane with the active conjugated diene polymer chains, a polymer chain terminal modifier or a coupling agent, which is conventionally used in an anion polymerization, can be incorporated in a polymerization mixture for allowing the polymer chains to react with the terminal modifier or coupling agent prior to the addition of the polymerization stopper, if desired.

If desired, additives such as, for example, an antioxidant, a crumb-forming agent and a scale build-up-preventing agent are added to the obtained polymer solution, and then, the polymer solution Is subjected to drying or steam stripping to remove a polymerization solvent, thus recovering the desired rubber. An extender oil can be incorporated in the polymer solution before a polymerization solvent is removed from the polymer solution whereby the rubber is recovered as an oil-extended rubber.

Rubber Composition

The rubber composition of the present invention comprises the above-mentioned conjugated diene rubber.

The rubber composition of the present invention may further comprise a rubber other than the above-mentioned conjugated diene rubber. As specific examples of such rubber, there can be mentioned natural rubber, a polyisoprene rubber, an emulsion-polymerized styrene-butadiene copolymer rubber, a solution-polymerized styrene-butadiene copolymer rubber (for example, a solution-polymerized styrene-butadiene copolymer rubber having a bound styrene content of 5 to 50% by weight and a 1,2-bond content in the 1,3-butadiene units of 10 to 80% by weight), a styrene-butadiene copolymer rubber or polybutadiene rubber, which has a high trans content, i.e., a trans bond content in the 1,3-butadiene units, in the range of 70 to 95% by weight, a polybutadiene rubber having a low cis bond content, a polybutadiene rubber having a high cis bond content, a styrene-isoprene copolymer rubber, a butadiene-isoprene copolymer rubber, a styrene-isoprene-butadiene copolymer rubber, a styrene-acrylonitrile-butadiene copolymer rubber, an acrylonitrile-butadiene copolymer rubber, a polystyrene-polybutadiene-polystyrene block copolymer, an acrylic rubber, an epichlorohydrin rubber, a fluororubber, a silicone rubber, an ethylene-propylene copolymer rubber and an urethane rubber. Of these, natural rubber, a polyisoprene rubber, a polybutadiene rubber and a styrene-butadiene copolymer rubber are preferable. These rubbers may be used either alone or as a combination of at least two thereof.

In the case when the rubber composition of the present invention comprises the above-mentioned optional rubber in addition to the above-mentioned conjugated diene rubber, it is preferable that the amount of the conjugated diene rubber is at least 10% by weight, more preferably in the range of 20 to 95% by weight and especially preferably 30 to 90% by weight, based on the total amount of the rubbers. If the amount of the conjugated diene rubber is too small, a crosslinked rubber is liable to have poorly balanced physical properties.

The rubber composition of the present invention preferably comprises silica.

As specific examples of silica, there can be mentioned dry process silica, wet process silica, colloidal silica and precipitated silica. Of these, wet process silica which is predominantly comprised of hydrous silica is preferable. A carbon-silica dual phase filler, which is a carbon black particle having silica supported on the surface thereof, may also be used. These silica may be used either alone or as a combination of at least two thereof. Silica preferably has a nitrogen adsorption specific surface area in the range of 50 to 400 $m^2/g$, more preferably 100 to 220 $m^2/g$, as measured by the BET method according to ASTM D3037-81. When the silica used has a specific surface area falling within this range, a resulting crosslinked rubber has more enhanced abrasion resistance and more reduced heat build-up.

The amount of silica incorporated is preferably in the range of 10 to 150 parts by weight, more preferably 20 to 120 parts by weight and especially preferably 40 to 100 parts by weight, based on 100 parts by weight of the total rubbers.

In the case when silica is incorporated, a silane coupling agent is preferably further incorporated to more reduce heat build-up and more improve abrasion resistance.

As specific examples of the silane coupling agent, there can be mentioned vinyltriethoxysilane, β-(3,4-epoxycyclohexyl)ethyltrimethoxysilane, N-(β-aminoethyl)-γ-aminopropyltrimethoxysilane, bis(3-(triethoxysilyl)propyl) disulfide, bis(3-(triethoxysilyl)propyl)tetrasulfide, γ-trimethoxysilylpropyldimethylthiocarbamyl tetrasulfide and γ-trimethoxysilylpropylbenzothiazyl tetrasulfide. Of these, silane coupling agents having a tetrasulfide structure are preferable. These silane coupling agents may be used either alone or as a combination of at least two thereof.

The amount of silane coupling agent incorporated is preferably in the range of 0.1 to 30 parts by weight, more preferably 1 to 15 parts by weight, based on 100 parts by weight of silica.

The rubber composition of the present invention may comprise carbon black such as furnace black, acetylene black, thermal black, channel black, graphite, graphite fiber and fullerene. Of these, furnace black is preferable, and, as specific examples thereof, there can be mentioned SAF, ISAF, ISAF-HS, ISAF-LS, IISAP-HS, HAF, HAF-HS, HAF-LS and FEF. The carbon black may be used either alone or as a combination of at least two thereof.

The carbon black preferably has a nitrogen adsorption specific surface area ($N_2SA$) in the range of 5 to 200 $m^2/g$, more preferably 80 to 130 $m^2/g$, and a dibutyl phthalate (DBP) adsorption in the range of 5 to 300 ml/100 g, more preferably 80 to 160 ml/100 g. When $N_2SA$ or DBP adsorption of the carbon black falls within these ranges, a resulting crosslinked rubber has improved mechanical properties and more enhanced abrasion resistance.

As carbon black, high-structure carbon black as described in JP-A H5-230290 is preferable, which has a cetyltrimethylammonium bromide (CTAB) adsorption surface area in the range of 110 to 170 $m^2/g$, and a DBP adsorption (24M4DBP), as measured after 4 times repetition of compression under a pressure of 165 MPa, in the range of 110 to 130 ml/100 g. By incorporation of this carbon black, abrasion resistance is more improved.

The amount of carbon black incorporated is usually not larger than 150 parts by weight based on 100 parts by weight of the total rubbers, and the sum of silica and carbon black is in the range of 10 to 150 parts by weight based on 100 parts by weight of the total rubbers.

The rubber composition of the present invention may further comprise, in addition to the above-mentioned ingredients, desired amounts of ingredients such as a crosslinking agent, a crosslinking accelerator, an accelerator activator, an antioxidant, an activator, a process oil, a plasticizer, a lubricant and a filler.

As the crosslinking agent, sulfur such as powdery sulfur, precipitated sulfur, colloidal sulfur, insoluble sulfur and highly dispersible sulfur; halogenated sulfur such as sulfur monochloride and sulfur dichloride; organic peroxides such as dicumyl peroxide and di-tert-butyl peroxide; quinone dioximes such as p-quinone dioxime and p,p'-dibenzoylquinone dioxime; organic polyamine compounds such as triethylenetetramine, hexamethylenediamine carbamate and 4,4'-methylene-bis-o-chloroaniline; and alkylphenol resins having a methylol group. Of these, sulfur is preferable. Powdery sulfur is especially preferable. These crosslinking agents may be used either alone or as a combination of at least thereof.

The amount of crosslinking agent is preferably in the range of 0.1 to 15 parts by weight, more preferably 0.5 to 5 parts by weight, based on 100 parts by weight of the total rubbers.

As specific examples of the crosslinking accelerator, there can be mentioned sulfenamide crosslinking accelerators such as N-cyclohexyl-2-benzothiazylsulfenamide, N-t-butyl-2-benzothiazolesulfenamide, N-oxyethylene-2-benzothiazolesulfenamide and N,N'-diisopropyl-2-benzothiazolesulfenamide; guanidine crosslinking accelerators such as diphenylguanidine, diorthotolylguanidine and orthotolylbiguanidine; thiourea crosslinking accelerators such as diethylthiourea; thiazole crosslinking accelerators such as 2-mercaptobenzothiazole, dibenzothiazyl disulfide and 2-meroaptobenzothiazole zinc salt; thiuram crosslinking accelerators such as tetramethylthiuram monosulfide and tetramethylthiuram disulfide; dithiocarbamate crosslinking accelerators such as sodium dimethyldithiocarbamate and zinc diethyldithiocarbamate; xanthogenate crosslinking accelerators such as sodium isopropylxanthogenate, zinc isopropylxanthogenate and zinc butylxanthogenate. Of these, sulfenamide crosslinking accelerators are preferable. These crosslinking accelerators may be used either alone or as a combination of at least two thereof.

The amount of the crosslinking accelerator used is preferably in the range of 0.1 to 15 parts by weight, more preferably 0.5 to 5 parts by weight, based on 100 parts by weight of the total monomers.

The accelerator activator used includes, for example, higher fatty acids such as stearic acid, and zinc oxide. As zinc oxide, zinc oxide with a particle diameter of not larger than 5 μm having a high surface activity is preferably used. As specific examples of the highly surface active zinc oxide, there can be mentioned active zinc white having a particle diameter in the range of 0.05 to 0.2 μm, and zinc white having a particle diameter in the range of 0.3 to 1 μm. Zinc oxide having been surface-treated with an amine dispersant or wetting agent may also be used.

The amount of the accelerator activator can appropriately chosen, but, the amount of a higher fatty acid is preferably in the range of 0.05 to 15 parts by weight, more preferably 0.5 to 5 parts by weight, based on 100 parts by weight of the total rubbers, and the amount of zinc oxide is preferably in the range of 0.05 to 10 parts by weight, more preferably 0.5 to 3 parts by weight, based on 100 parts by weight of the total rubbers.

The process oil used includes a mineral oil and a synthetic oil. As the mineral oil, an aromatic oil, a naphthenic oil and a paraffinic oil are usually used. The other ingredients include activators such as silicone oil, diethylene glycol and polyethylene glycol; fillers such as calcium carbonate, talc and clay; tackifiers such as petroleum resin and coumarone resin; and wax.

A silica-incorporated rubber composition can be prepared by kneading together the ingredients by a conventional procedure. For example, ingredients, other than a crosslinking agent and a crosslinking accelerator, are kneaded together with an oil-extended rubber, and then, a crosslinking agent and a crosslinking accelerator are added to and kneaded together with the kneaded mixture, to give the rubber composition.

The kneading of the ingredients other than a crosslinking agent and a crosslinking accelerator, with an oil-extended rubber is carried out preferably at a temperature in the range of 80 to 200° C., more preferably 120 to 180° C., and for a time in the range of 30 seconds to 30 minutes.

The addition and mixing of a crosslinking agent and a crosslinking accelerator is usually carried out after the kneaded mixture is cooled to a temperature of not higher than 100° C., preferably not higher than 80° C.

The rubber composition of the present invention is practically used usually after it is crosslinked. The crosslinking procedure is not particularly limited, and can appropriately chosen depending upon the shape and size of a crosslinked product. Crosslinking can be conducted simultaneously with shaping by a procedure wherein a rubber composition containing a crosslinking agent is filled in a mold and then heated. Alternatively, a procedure can be adopted wherein a rubber composition containing a crosslinking agent is shaped, and then, the shaped product is heated to be thereby crosslinked. The crosslinking temperature is preferably in the range of 120 to 200° C., more preferably 140 to 180° C., and the crosslinking time is usually in the range of about 1 to about 120 minutes.

EXAMPLES

The invention will now be specifically described by the following examples and comparative examples. Parts and % in the examples and comparative examples are by weight unless otherwise specified.

Properties of rubbers, rubber compositions and crosslinked rubbers were evaluated by the following methods.

(1) Bound Styrene Unit Content, Bound Isoprene Unit Content and Vinyl Bond Content in Conjugated Diene Rubber These contents were measured by $^{13}$C-NMR.

(2) Content of Branched Conjugated Diane Polymer

Before and after a conjugated diene polymer was allowed to react with a polyorganosiloxane, the content of branched conjugated diene polymer was measured by gel permeation chromatography under the following conditions.

Measuring Apparatus: HLC-8020 made by Tosoh Corporation

Column: GMH-HR-H (two columns connected in series; made by Tosoh Corporation)

Detector: differential refractometer RI-8020 (made by Tosoh Corporation)

Eluting solution: tetrahydrofuran

Column temperature: 40° C.

From the obtained charts, a weight fraction, per the total weight of a finally obtained conjugated diene polymer, of a conjugated diene polymer having a molecular weight of three times of the molecular weight peak of the conjugated diene polymer before the reaction with a polyorganosiloxane was calculated. Similarly, a weight fraction, per the total weight of a finally obtained conjugated diene polymer, of a conjugated diene polymer having a molecular weight of at least four times of the molecular weight peak of the conjugated diene polymer before the reaction with a polyorganosiloxane was calculated. The former weight fraction and the latter weight fraction were expressed as the amount of polymer with three branches and the amount of polymer with at least four branches, respectively. The sum of the amount of polymer with three branches and the amount of polymer with at least four branches is expressed as the amount of polymer with at least three branches.

(3) Mooney Viscosity

Mooney viscosity ($ML_{1+4}$, 100° C.) of a rubber was measured according to JIS K6300.

(4) Processability of Uncrosslinked Rubber Composition

Processability of an uncrosslinked rubber composition was evaluated by the following four testing methods.

(4-1) The rubber composition was kneaded by a Banbury mixer, and state and appearance of the kneaded rubber composition, taken from the mixer, were observed and expressed by the following four ratings.

| | |
|---|---|
| Many lumps were found | point 1 |
| A mass and several small lumps | point 2 |
| A somewhat irregularly shaped large mass | point 3 |
| A clean large mass | point 4 |

(4-2) The rubber composition was roll-milled, and the state of the rubber composition wound around a roll was observed while being roll-milled, and expressed by the following four ratings.

| | |
|---|---|
| Not wound | point 1 |
| Wound with difficulty | point 2 |
| Wound | point 3 |
| Easily wound | point 4 |

(4-3) The state and appearance of the rubber composition were observed while the rubber composition was roll-milled.

| | |
|---|---|
| Large hole were found | point 1 |
| Small holes were found | point 2 |
| Occasionally small holes were found | point 3 |
| Rubber composition covered the entire surface of roll | point 4 |

(4-4) The rubber composition was roll-milled, and appearance of the surface of the milled rubber composition taken from the roll was observed.

| | |
|---|---|
| Very rough | point 1 |
| Slightly rough | point 2 |
| Nearly even and smooth | point 3 |
| Even, smooth and lustrous | point 4 |

The total of points in the above-four ratings was evaluated according to the following five ratings.

| | |
|---|---|
| Total points 4–5 | point 1 |
| Total points 6–8 | point 2 |
| Total points 9–10 | point 3 |
| Total points 11–13 | point 4 |
| Total points 14–16 | point 5 |

(5) Low Heat Build-up

Low heat build-up was expressed in terms of tan δ as measured by using RDA-II available from Rheometric Scientific Inc. at a twist of 0.5%, a frequency of 20 Hz and a temperature of 60° C. The low heat build-up was expressed by a relative index. The smaller the relative index, the better the low heat build-up.

(6) Wet Grip Performance

Wet grip performance was expressed in terms of tan δ as measured by using RDA-II available from Rheometric Scientific Inc. at a twist of 0.5%, a frequency of 20 Hz and a temperature of 0° C. The wet grip performance was expressed by a relative index. The larger the relative index, the better the wet grip performance.

(7) Abrasion Resistance

Abrasion resistance was measured by a Lambourn abrasion tester according to JIS K6264. The abrasion resistance was expressed by a relative index (abrasion resistance index). The larger the abrasion resistance index, the better the abrasion resistance.

(8) Tensile Strength Characteristic

A tensile test was conducted according to JIS K6301 and a tensile stress at an elongation of 300% was measured. The tensile stress was expressed by a relative index. The larger the relative index, the better the tensile strength characteristic.

Example 1

An autoclave equipped with a stirrer was charged with 6,000 g of cyclohexane, 150 g of styrene, 450 g of 1,3-butadiene, and tetramethylethylenediamine in an amount of 1.5 times by mole of n-butyllithium used. Then, 9.5 millimoles of n-butyllithium was added to initiate polymerization at 50° C. When 20 minutes elapsed from the initiation of polymerization, a mixture of 60 g of styrene and 340 g of 1,3-butadiene was continuously added over a period of 60 minutes. The highest temperature reached during polymerization was 70° C.

After completion of the continuous addition, polymerization was further continued for 40 minutes. After confirmation of the fact that the polymerization conversion reached 100%, a small amount of a polymer solution was sampled. An excessive amount of methanol was added to the polymer solution sample to stop the reaction. The polymer was air-dried to recover a polymer specimen for analysis by gel permeation chromatography.

Immediately after the small amount of polymer solution was sampled as mentioned above, a 10% solution in toluene of polyorganosiloxane A in an amount of 0.03 time by mole of the n-butyllithium used was added to a polymerization mixture, and a reaction was carried out for 30 minutes. Methanol in an amount of twice by mole of n-butyllithium used was added as a polymerization stopper to give a polymerization liquid containing a conjugated diene rubber I.

Irganox 1520 (available from Ciba-Geigy AG) as an antioxidant was added to the polymerization liquid. The amount of Irganox 1520 was 0.2 part per 100 parts of the conjugated diene rubber I in the polymerization liquid. A polymerization solvent was removed by steam stripping, and the obtained polymer was vacuum-dried at 60° C. for 24 hours to give a solid conjugated diene rubber I.

A mixture of 70 parts of the conjugated diene rubber I and 30 parts of high-cis polybutadiene rubber (Nipol BR1220 available from Zeon Corporation) was masticated in a 250 ml Brabender mixer for 30 seconds. Then 50 parts of silica (Nipsil AQ available from Nippon Silica Kogyo K.K.) and 4.5 parts of a silane coupling agent (Si69 available from Degussa AG) were added, and the mixture was kneaded at an initiation temperature of 110° C. for 2 minutes. Further, 10 parts of a process oil (Diana Process Oil NS-100 available from Idemitsu Kosan K.K.), 10 parts of silica (Nipsil AQ available from Nippon Silica Kogyo K.K.), 2 parts of zinc oxide, 1.5 parts of stearic acid and 1.5 parts of an antioxidant (Nocrac 6C available from Ouchi Shinko Kagaku Kogyo K.K.) were added, and the mixture was kneaded for 2 minutes. The kneaded rubber mixture was taken from the mixer. The temperature of the kneaded rubber mixture upon completion of the kneading was 150° C.

The kneaded rubber mixture was cooled to room temperature, and, again kneaded in a Brabender mixer at an initiation temperature of 110° C. for 3 minutes. The kneaded rubber mixture was taken from the mixer.

A mixture of the thus-obtained kneaded rubber mixture with 1.5 parts of sulfur and a crosslinking accelerator (a mixture of 1.5 parts of N-cyclohexyl-2-benzothiazylsulfenamide with 0.9 part of diphenylguanidine) was kneaded together by an open roll at 50° C. to give a rubber composition of a sheet form. The processability of the sheet-form uncrosslinked rubber composition was evaluated. The results are shown in Table 1.

The uncrosslinked rubber composition was press-cured at 160° C. for 30 minutes to prepare a crosslinked rubber specimen. The low heat build-up, wet grip performance, abrasion resistance and tensile stress of the specimen were evaluated. The results are shown in Table 1, wherein the factual data are expressed by relative indexes as the data obtained in Comparative Example 1 being 100.

Examples 2–7 and Comparative Examples 1–3

Conjugated diene rubbers II through X were prepared by the same procedures as described in Example 1 except that, after the confirmation of the fact that the polymerization conversion reached 100%, polyorganosiloxanes A through G were added in amounts shown in Table 1, and the amount of n-butyllithium used was changed so that conjugated diene rubbers having a Mooney viscosity shown in Table 1 were obtained. All other conditions remained the same. The properties of conjugated diene rubbers II through X were evaluated. The results are shown in Table 1.

Rubber compositions were prepared by the same procedures as described in Example 1 except for using conjugated diene rubbers II through X instead of conjugated diene rubber I. Processability of uncrosslinked rubber compositions and properties of crosslinked rubbers were evaluated. The results are shown in Table 1.

Polyorganosiloxanes A through F used are represented by the following general formula (3).

General formula (3):

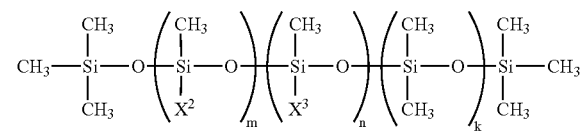

Polyorganosiloxane A m = 42, n = 0, k = 85,
X²: 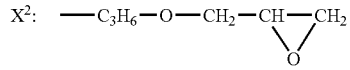

Polyorganosiloxane B m = 61, n = 0, k = 100,
X²: 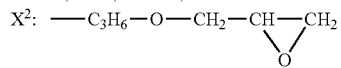

Polyorganosiloxane C m = 60, n = 0, k = 0,
X²: 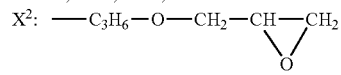

Polyorganosiloxane D m = 45, n = 10, k = 70,
X²: 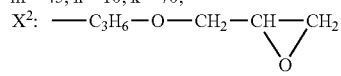

X³: —C₃H₆—O—C₂H₄—O—C₂H₄—O—C₂H₄—OCH₃

Polyorganosiloxane E m = 6, n = 0, k = 4,
X²: 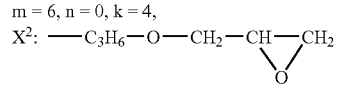

Polyorganosiloxane F m = 6, n = 0, k = 4,
X²: 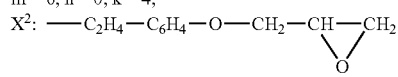

——C₆H₄——: phenylene group

Polyorganosiloxane G used in Comparative Example 1 is represented by the following general formula (10).

Polyorganosiloxane G

General Formula (10):

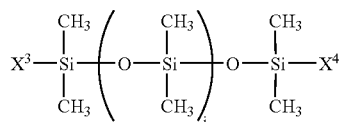

i = 20,
X³: 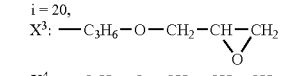
X⁴: 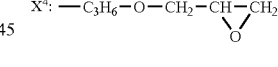

TABLE 1

|  | Examples | | | | | | | Comparative Examples | | |
| --- | --- | --- | --- | --- | --- | --- | --- | --- | --- | --- |
|  | 1 | 2 | 3 | 4 | 5 | 6 | 7 | 1 | 2 | 3 |
| Additives |  |  |  |  |  |  |  |  |  |  |
| Polyorganosiloxane | A | A | B | C | D | E | F | G | A | — |
| Silane compound | — | — | — | — | — | — | — | — | — | TMS *1 |
| Amount used *2 | 0.03 | 0.03 | 0.02 | 0.02 | 0.027 | 0.05 | 0.05 | 1 | 0.5 | 0.3 |
| Conjugated Diene Rubber | I | II | III | IV | V | VI | VII | VIII | IX | X |
| Mooney viscosity | 54 | 65 | 54 | 56 | 54 | 55 | 55 | 54 | 55 | 56 |
| Amount of styrene units (%) | 21 | 21 | 21 | 21 | 21 | 21 | 21 | 21 | 21 | 21 |
| Content of vinyl bond (%) | 63 | 63 | 63 | 63 | 63 | 63 | 63 | 63 | 63 | 63 |
| Amount of polymer with 3 branches (%) | 15 | 14 | 16 | 15 | 18 | 11 | 10 | 0 | 1 | 35 |
| Amount of polymers with at least 4 branches (%) | 10 | 10 | 13 | 53 | 15 | 8 | 5 | 0 | 1 | 25 |
| Amount of polymers with at least 3 branches (%) | 25 | 24 | 29 | 68 | 33 | 19 | 15 | 0 | 2 | 60 |

TABLE 1-continued

|  | Examples | | | | | | | Comparative Examples | | |
| --- | --- | --- | --- | --- | --- | --- | --- | --- | --- | --- |
|  | 1 | 2 | 3 | 4 | 5 | 6 | 7 | 1 | 2 | 3 |
| Properties of Rubber Composition | | | | | | | | | | |
| Processability of uncrosslinked rubber (point) | 5 | 5 | 5 | 5 | 5 | 4 | 3 | 2 | 2 | 4 |
| Low heat build-up (index) | 78 | 72 | 73 | 61 | 71 | 82 | 90 | 100 | 97 | 115 |
| Wet grip performance (index) | 108 | 111 | 110 | 123 | 108 | 107 | 105 | 100 | 96 | 98 |
| Abrasion resistance (index) | 116 | 126 | 133 | 145 | 148 | 111 | 109 | 100 | 103 | 95 |
| Tensile stress (index) | 161 | 176 | 183 | 197 | 144 | 133 | 125 | 100 | 105 | 97 |

*1 Tetramethoxysilane
*2 Amount by mole per mole of n-butyllithium

The following will be seen from Table 1.

Conjugated diene rubber VIII, which was prepared in Comparative Example 1 wherein a large amount of polyorganosiloxane G having a small number of functional groups was used, did not contain a polymer with at least three branches. An uncrosslinked rubber composition comprising the conjugated diene rubber VIII had poor processability, and a crosslinked rubber thereof did not have well balanced properties.

Conjugated diene rubber IX, which was prepared in Comparative Example 2 wherein polyorganosiloxane A capable of being used in the present invention was used but its amount was larger than that stipulated in the present invention, contained an extremely reduced amount of a polymer with at least three branches. An uncrosslinked rubber composition comprising the conjugated diene rubber IX had poor processability, and a crosslinked rubber thereof had a somewhat improved abrasion resistance but exhibited high heat build-up and had poor wet grip performance.

Conjugated dione rubber X, which was prepared in Comparative Example 3 wherein tetramethoxysilane was used instead of the polyorganosiloxane, contained a large amount of a polymer with at least three branches. A silica-incorporated uncrosslinked rubber composition comprising the conjugated diene rubber X had good processability, but a crosslinked rubber thereof had high heat build up, poor wet grip performance and poor abrasion resistance.

In contrast to the above-mentioned rubbers prepared in the comparative examples, conjugated diene rubbers which were prepared in Examples 1 to 7 according to the present invention contained a specified amount of a polymer with at least three branches. Uncrosslinked rubber compositions comprising these rubbers had good processability, and crosslinked rubbers thereof had low heat build-up, good wet grip performance and good abrasion resistance.

Example 8

An autoclave equipped with a stirrer was charged with 6,000 g of cyclohexane, 160 g of styrene, 440 g of 1,3-butadiene, and tetramethylethylenediamine in an amount of 1.4 times by mole of n-butyllithium used. Then, 9.4 millimoles of n-butyllithium was added to initiate polymerization at 50° C. When 20 minutes elapsed from the initiation of polymerization, a mixture of 70 g of styrene and 330 g of 1,3-butadiene was continuously added over a period of 60 minutes. The highest temperature reached during polymerization was 70° C.

After completion of the continuous addition, polymerization was further continued for 40 minutes. After confirmation of the fact that the polymerization conversion reached 100%, a small amount of a polymer solution was sampled. An excessive amount of methanol was added to the polymer solution sample to stop the reaction. The polymer was air-dried to recover a polymer specimen for analysis by gel permeation chromatography.

Immediately after the small amount of polymer solution was sampled as mentioned above, a 10% solution in toluene of polyorganosiloxane H in an amount of 0.05 time by mole of the n-butyllithium used was added to a polymerization mixture, and a reaction was carried out for 30 minutes. Methanol in an amount of twice by mole of n-butyllithium used was added as a polymerization stopper to give a polymerization liquid containing a conjugated diene rubber XI.

Irganox 1520 (available from Ciba-Geigy AG) as an antioxidant was added to the polymerization liquid. The amount of Irganox 1520 was 0.2 part per 100 parts of the conjugated diene rubber XI in the polymerization liquid. A polymerization solvent was removed by steam stripping, and the obtained polymer was vacuum-dried at 60° C. for 24 hours to give a solid conjugated diene rubber XI.

A mixture of 80 parts of the conjugated diene rubber XI and 20 parts of high-cis polybutadiene rubber (Nipol BR1220 available from Zeon Corporation) was masticated in a 250 ml Brabender mixer for 30 seconds. Then 60 parts of silica (Nipsil AQ available from Nippon Silica Kogyo K.K.) and 5 parts of a silane coupling agent (Si69 available from Degussa AG) were added, and the mixture was kneaded at an initiation temperature of 110° C. for 2 minutes. Further, 15 parts of a process oil (Diana Process Oil NS-100 available from Idemitsu Kosan K.K.), 10 parts of silica (Nipsil AQ available from Nippon Silica Kogyo K.K.), 2 parts of zinc oxide, 1.5 parts of stearic acid and 1.5 parts of an antioxidant (Nocrac 6C available from Ouchi Shinko Kagaku Kogyo K.K.) were added, and the mixture was kneaded for 2 minutes. The kneaded rubber mixture was taken from the mixer. The temperature of the kneaded rubber mixture upon completion of the kneading was 150° C.

The kneaded rubber mixture was cooled to room temperature, and, again kneaded in a Brabender mixer at an initiation temperature of 110° C. for 3 minutes. The kneaded rubber mixture was taken from the mixer.

A mixture of the thus-obtained kneaded rubber mixture with 1.5 parts of sulfur and a crosslinking accelerator (a mixture of 1.5 parts of N-cyclohexyl-2-benzothiazylsulfenamide with 0.9 part of diphenylguanidine) was kneaded together by an open roll at 50° C. to give a rubber composition of a sheet form. The processability of the sheet-form uncrosslinked rubber composition was evaluated. The results are shown in Table 2.

The uncrosslinked rubber composition was press-cured at 160° C. for 30 minutes to prepare a crosslinked rubber specimen. The low heat build-up, wet grip performance, abrasion resistance and tensile stress of the specimen were evaluated. The results are shown in Table 2, wherein the factual data are expressed by relative indexes as the data obtained in Comparative Example 4 being 100.

Examples 9 and 10

Conjugated diene rubbers XII and XIII were prepared by the same procedures as described in Example 8 except that, after the confirmation of the fact that the polymerization conversion reached 100%, polyorganosiloxane J was added in amounts shown in Table 2, and the amount of n-butyllithium used was changed so that conjugated diene rubbers having a Mooney viscosity shown in Table 2 were obtained. All other conditions remained the same. The properties of conjugated diene rubbers XII and XIII were evaluated. The results are shown in Table 2.

Rubber compositions were prepared by the same procedures as described in Example 8 except for using conjugated diene rubbers XII and XIII instead of conjugated diene rubber XI. Processability of uncrosslinked rubber compositions and properties of crosslinked rubbers were evaluated. The results are shown in Table 2.

Comparative Example 4

Conjugated diene rubber XIV was prepared by the same procedures as described in Example 8 except that, after the confirmation of the fact that the polymerization conversion reached 100%, polyorganosiloxane K having epoxy group-containing groups at both ends of its polymer chain was added in an amount shown in Table 2, and the amount of n-butyllithium used was changed so that conjugated diene rubber having a Mooney viscosity shown in Table 2 was obtained. All other conditions remained the same. The properties of conjugated diene rubber XIV were evaluated. The results are shown in Table 2.

A rubber composition was prepared by the same procedures as described in Example 8 except for using conjugated diene rubber XIV instead of conjugated dione rubber XI. Processability of an uncrosslinked rubber composition and properties of a crosslinked rubber were evaluated. The results are shown in Table 2.

Comparative Example 5

Conjugated diene rubber XV was prepared by the same procedures as described in Example 8 except that, after the confirmation of the fact that the polymerization conversion reached 100%, polyorganosiloxane H was added in an enhanced amount shown in Table 2, and the amount of n-butyllithium used was changed so that conjugated diene rubber having a Mooney viscosity shown in Table 2 was obtained. All other conditions remained the same. The properties of conjugated diene rubber XV were evaluated. The results are shown in Table 2.

A rubber composition was prepared by the same procedures as described in Example 8 except for using conjugated diene rubber XV instead of conjugated diene rubber XI. Processability of an uncrosslinked rubber composition and properties of a crosslinked rubber were evaluated. The results are shown in Table 2.

Comparative Example 6

Conjugated diene rubber XVI was prepared by the same procedures as described in Example 8 except that, after the confirmation of the fact that the polymerization conversion reached 100%, tetramethoxysilane was added in an enhanced amount shown in Table 2, and the amount of n-butyllithium used was changed so that conjugated diene rubber having a Mooney viscosity shown in Table 2 was obtained. All other conditions remained the same. The properties of conjugated diene rubber XVI were evaluated. The results are shown in Table 2.

A rubber composition was prepared by the same procedures as described in Example 8 except for using conjugated diene rubber XVI Instead of conjugated dione rubber XI. Processability of an uncrosslinked rubber composition and properties of a crosslinked rubber were evaluated. The results are shown in Table 2.

Polyorganosiloxanes H, J and K used in the above example and comparative examples are represented by the following general formula (5).

General formula (5):

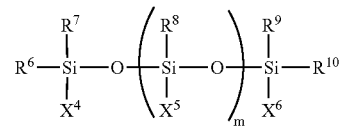

Polyorganosiloxane H m = 21, $X^4, X^5, X^6$: 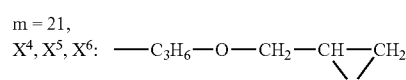

$R^8 \sim R^{10}$: —CH$_3$

Polyorganosiloxane J m = 46, $X^4, X^5, X^6$: 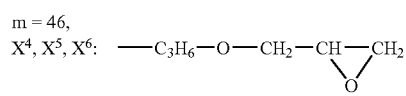

$R^6 \sim R^{10}$: —CH$_3$

Polyorganosiloxane K m = 20, $X^4, X^6$: 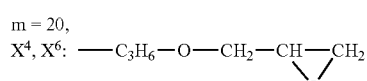

$X^5$: —CH$_3$,  $R^6 \sim R^{10}$: —CH$_3$

TABLE 2

|  | Examples | | | Comparative Examples | | |
|---|---|---|---|---|---|---|
|  | 8 | 9 | 10 | 4 | 5 | 6 |
| Additives |  |  |  |  |  |  |
| Polyorganosiloxane | H | J | J | K | H | — |
| Silane compound | — | — | — | — | — | TMS *1 |
| Amount used *2 | 0.05 | 0.023 | 0.04 | 1 | 0.5 | 0.3 |

TABLE 2-continued

|  | Examples | | | Comparative Examples | | |
| --- | --- | --- | --- | --- | --- | --- |
|  | 8 | 9 | 10 | 4 | 5 | 6 |
| Conjugated Diene Rubber | XI | XII | XIII | XIV | XV | XVI |
| Mooney viscosity | 52 | 55 | 60 | 49 | 52 | 53 |
| Amount of styrene units (%) | 23 | 23 | 23 | 23 | 23 | 23 |
| Content of vinyl bond (%) | 55 | 55 | 55 | 55 | 55 | 55 |
| Amount of polymer with 3 branches (%) | 14 | 18 | 22 | 0 | 1 | 30 |
| Amount of polymers with at least 4 branches (%) | 21 | 31 | 43 | 0 | 2 | 23 |
| Amount of polymers with at least 3 branches (%) | 35 | 49 | 65 | 0 | 3 | 53 |
| Properties of Rubber Composition | | | | | | |
| Processability of uncrosslinked rubber (point) | 5 | 5 | 5 | 2 | 2 | 4 |
| Low heat build-up (index) | 87 | 73 | 63 | 100 | 97 | 112 |
| Wet grip performance (index) | 110 | 113 | 118 | 100 | 96 | 98 |
| Abrasion resistance (index) | 109 | 133 | 145 | 100 | 102 | 97 |
| Tensile stress (index) | 152 | 170 | 186 | 100 | 104 | 95 |

*1 Tetramethoxysilane
*2 Amount by mole per mole of n-butyllithium

The following will be seen from Table 2.

Conjugated diene rubber XIV, which was prepared in Comparative Example 4 wherein a large amount of polyorganosiloxane K having a small number of epoxy groups was used, did not contain a polymer with at least three branches. An uncrosslinked rubber composition comprising the conjugated diene rubber XIV had poor processability, and a crosslinked rubber thereof did not have well balanced properties.

Conjugated diene rubber XV, which was prepared in Comparative Example 5 wherein polyorganosiloxane H capable of being used in the present invention was used but its amount was larger than that stipulated in the present invention, contained an extremely reduced amount of a polymer with at least three branches. An uncrosslinked rubber composition comprising the conjugated diene rubber XV had poor processability, and a crosslinked rubber thereof had a somewhat improved abrasion resistance but exhibited high heat build-up and had poor wet grip performance.

Conjugated diene rubber XVI, which was prepared in Comparative Example 6 wherein tetramethoxysilane was used instead of the polyorganosiloxane, contained a large amount of a polymer with at least three branches. A silica-incorporated uncrosslinked rubber composition comprising the conjugated diene rubber XVI had good processability, but a crosslinked rubber thereof had high heat build up, poor wet grip performance and poor abrasion resistance.

In contrast to the above-mentioned rubbers prepared in the comparative examples, conjugated diene rubbers which were prepared in Examples 8 to 10 according to the present invention contained a specified amount of a polymer with at least three branches. Uncrosslinked rubber compositions comprising these rubbers had goor processability, and crosslinked rubbers thereof had low heat build-up, good wet grip performance and good abrasion resistance.

Example 11

An autoclave equipped with a stirrer was charged with 6,000 g of cyclohexane, 160 g of styrene, 440 g of 1,3-butadiene, and tetramethylethylenediamine in an amount of 0.9 time by mole of n-butyllithium used. Then, 9.2 milli-moles of n-butyllithium was added to initiate polymerization at 45° C. When 20 minutes elapsed from the initiation of polymerization, a mixture of 40 g of styrene and 360 g of 1,3-butadiene were continuously added over a period of 60 minutes. The highest temperature reached during polymerization was 70° C.

After the completion of addition of the monomer mixture, polymerization was further continued for 30 minutes. After confirmation of the fact that the polymerization conversion reached 100%, 20 g of isoprene was added and polymerization was continued further for 20 minutes.

After the confirmation of polymerization conversion of 100%, a small amount of a polymer solution was sampled. An excessive amount of methanol was added to the polymer solution sample to stop the reaction. The polymer was air-dried to recover a polymer specimen for analysis by gel permeation chromatography.

Immediately after the small amount of polymer solution was sampled as mentioned above, a 10% solution in toluene of polyorganosiloxane L in an amount of 0.027 time by mole of the n-butyllithium used was added to a polymerization mixture, and a reaction was carried out for 30 minutes, Methanol in an amount of twice by mole of n-butyllithium used was added as a polymerization stopper to give a polymerization liquid containing a conjugated diene rubber A.

Irganox 1520 (available from Ciba-Geigy AG) as an antioxidant was added to the polymerization liquid. The amount of Irganox 1520 was 0.2 part per 100 parts of the conjugated dione rubber A in the polymerization liquid. A polymerization solvent was removed by steam stripping, and the obtained polymer was vacuum-dried at 60° C. for 24 hours to give a solid conjugated diene rubber A. Properties of this rubber were evaluated. The results are shown in Table 3.

A mixture of 80 parts of the conjugated diene rubber A and 20 parts of high-cis polybutadiene rubber (Nipol BR1220 available from Zeon Corporation) was masticated in a 250 ml Brabender mixer for 30 seconds. Then 50 parts of silica (Nipsil AQ available from Nippon Silica Kogyo K.K.) and 4.5 parts of a silane coupling agent (S169 available from Degussa AG) were added, and the mixture was kneaded at an initiation temperature of 110° C. for 2 minutes. Further, 10 parts of a process oil (Diana Process Oil NS-100 available from Idemitsu Kosan K.K.), 10 parts of silica (Nipsil AQ available from Nippon Silica Kogyo K.K.), 2 parts of zinc oxide, 1.5 parts of stearic acid and 1.5 parts of an antioxidant (Nocrac 6C available from Ouchi Shinko Kagaku Kogyo K.K.) were added, and the mixture was kneaded for 2 minutes. The kneaded rubber mixture was taken from the mixer. The temperature of the kneaded rubber mixture upon completion of the kneading was 150° C.

The kneaded rubber mixture was cooled to room temperature, and, again kneaded in a Brabender mixer at an initiation temperature of 110° a for 3 minutes. The kneaded rubber mixture was taken from the mixer.

A mixture of the thus-obtained kneaded rubber mixture with 1.5 parts of sulfur and a crosslinking accelerator (a mixture of 1.5 parts of N-cyclohexyl-2-benzothiazylsulfenamide with 0.9 part of diphenylguanidine) was kneaded together by an open roll at 50° C. to give a rubber composition of a sheet form. The processability of the sheet-form uncrosslinked rubber composition was evaluated. The results are shown in Table 3.

The uncrosslinked rubber composition was press-cured at 160° C. for 30 minutes to prepare a crosslinked rubber specimen. The low heat build-up, wet grip performance, abrasion resistance and tensile stress of the specimen were evaluated. The results are shown in Table 3, wherein the factual data are expressed by relative indexes as the data obtained in Comparative Example 7 being 100.

Examples 12–15 and Comparative Examples 7–9

Conjugated diene rubbers B through J were prepared by the same procedures as described in Example 11 except that the amount and polymerization time of isoprene were changed as shown in Table 3, and, after the confirmation of the fact that the polymerization conversion reached 100%, polyorganosiloxanes L through R were added in amounts shown in Table 3 and the amount of n-butyllithium used was changed so that conjugated diene rubbers having a Mooney viscosity shown in Table 3 were obtained. All other conditions remained the same. The properties of conjugated diene rubbers B through J were evaluated. The results are shown in Table 3.

Rubber compositions were prepared by the same procedures as described in Example 11 except for using conjugated diene rubbers B through J instead of conjugated diene rubber A. Processability of uncrosslinked rubber compositions and properties of crosslinked rubbers were evaluated. The results are shown in Table 3.

Polyorganosiloxanes L through R used are represented by the following general formula (2).

General formula (2):

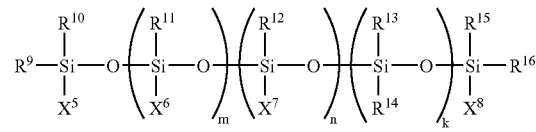

Polyorganosiloxane L $m = 42, n = 0, k = 85,$ $X^6$: 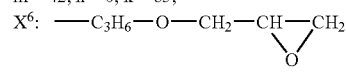

$X^5, X^8, R^9 \sim R^{11}, R^{13} \sim R^{16}$: —$CH_3$

Polyorganosiloxane M $m = 61, n = 0, k = 100,$ $X^6$: 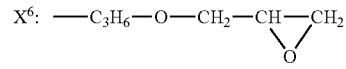

$X^5, X^8, R^9 \sim R^{11}, R^{13} \sim R^{16}$: —$CH_3$

Polyorganosiloxane N $m = 60, n = 0, k = 0,$ $X^6$: 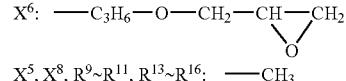

$X^5, X^8, R^9 \sim R^{11}, R^{13} \sim R^{16}$: —$CH_3$

Polyorganosiloxane P $m = 45, n = 10, k = 70,$ $X^6$: 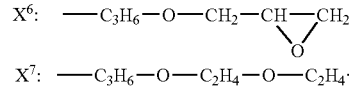

$X^7$: —$C_3H_6$—O—$C_2H_4$—O—$C_2H_4$—O—$C_2H_4$—$OCH_3$ $X^5, X^8, R^9 \sim R^{16}$: —$CH_3$ Polyorganosiloxane Q $m = 46, n = 0, k = 0,$ $X^5, X^6, X^8$: 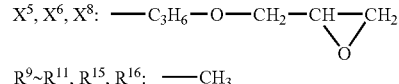

$R^9 \sim R^{11}, R^{15}, R^{16}$: —$CH_3$

Polyorganosiloxane R $m = 0, n = 0, k = 20,$ $X^5, X^8$: 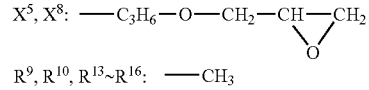

$R^9, R^{10}, R^{13} \sim R^{16}$: —$CH_3$

TABLE 3

|  | Examples | | | | | Comparative Examples | | |
| --- | --- | --- | --- | --- | --- | --- | --- | --- |
|  | 11 | 12 | 13 | 14 | 15 | 7 | 8 | 9 |
| Post reaction | | | | | | | | |
| Isoprene (g) | 20 | 10 | 20 | 20 | 20 | 20 | 20 | 0 |
| Reaction time (min) | 20 | 10 | 20 | 20 | 20 | 20 | 20 | — |
| Coupling Reaction | | | | | | | | |
| Polyorganosiloxane | L | M | N | P | Q | R | L | — |
| Silane compound | — | — | — | — | — | — | — | TMS *1 |
| Amount used *2 | 0.027 | 0.025 | 0.02 | 0.03 | 0.024 | 1 | 0.5 | 0.3 |

TABLE 3-continued

|  | Examples | | | | | Comparative Examples | | |
| --- | --- | --- | --- | --- | --- | --- | --- | --- |
|  | 11 | 12 | 13 | 14 | 15 | 7 | 8 | 9 |
| Conjugated Diene Rubber | A | B | C | E | F | G | H | J |
| Mooney viscosity | 48 | 52 | 46 | 45 | 46 | 48 | 45 | 52 |
| Amount of styrene units (%) | 19.6 | 19.8 | 19.7 | 19.6 | 19.7 | 19.5 | 19.7 | 19.9 |
| Content of vinyl bond (%) | 55 | 56 | 55 | 55 | 56 | 55 | 55 | 56 |
| Amount of isoprene units (%) | 1.9 | 0.9 | 1.9 | 1.8 | 1.9 | 1.9 | 1.8 | 0 |
| Amount of polymer with 3 branches (%) | 15 | 17 | 16 | 11 | 14 | 0 | 2 | 34 |
| Amount of polymers with at least 4 branches (%) | 12 | 15 | 48 | 25 | 50 | 0 | 1 | 20 |
| Amount of polymers with at least 3 branches (%) | 27 | 32 | 64 | 36 | 64 | 0 | 3 | 54 |
| Properties of Rubber Composition | | | | | | | | |
| Processability of uncrosslinked rubber (point) | 5 | 5 | 5 | 5 | 5 | 2 | 2 | 4 |
| Low heat build-up (index) | 83 | 78 | 61 | 72 | 63 | 100 | 96 | 115 |
| Wet grip performance (index) | 105 | 110 | 120 | 115 | 126 | 100 | 97 | 94 |
| Abrasion resistance (index) | 116 | 120 | 138 | 128 | 140 | 100 | 104 | 92 |
| Tensile stress (index) | 110 | 132 | 175 | 142 | 168 | 100 | 103 | 94 |

*1 Tetramethoxysilane
*2 Amount by mole per mole of n-butyllithium

The following will be seen from Table 3.

Conjugated diene rubber G, which was prepared in Comparative Example 7 wherein a large amount of polyorganosiloxane R having a small number of functional groups was used, did not contain a polymer with at least three branches. An uncrosslinked rubber composition comprising the conjugated diene rubber G had poor processability, and a crosslinked rubber thereof did not have well balanced properties.

Conjugated diene rubber H, which was prepared in Comparative Example 8 wherein polyorganosiloxane L capable of being used in the present invention was used but its amount was larger than that stipulated in the present invention, contained an extremely reduced amount of a polymer with at least three branches. An uncrosslinked rubber composition comprising the conjugated diene rubber H had poor processability, and a crosslinked rubber thereof had a somewhat improved abrasion resistance but exhibited high heat build-up and had poor wet grip performance.

Conjugated diene rubber J, which was prepared in Comparative Example 9 wherein tetramethoxysilane was used instead of the polyorganosiloxane, contained a large amount of a polymer with at least three branches. A silica-incorporated uncrosslinked rubber composition comprising the conjugated diene rubber J had good processability, but a crosslinked rubber thereof had high heat build up, poor wet grip performance and poor abrasion resistance.

In contrast to the above-mentioned rubbers prepared in the comparative examples, conjugated diene rubbers which were prepared in Examples 11 to 15 according to the present invention contained a specified amount of a polymer with at least three branches. Uncrosslinked rubber compositions comprising these rubbers had goor processability, and crosslinked rubbers thereof had low heat build-up, good wet grip performance and good abrasion resistance.

INDUSTRIAL APPLICABILITY

The conjugated diene rubber of the present invention gives, when silica is incorporated therein, an uncrosslinked rubber composition having good processability, and giving a crosslinked rubber having sufficiently reduced heat build-up, good wet grip performance and good abrasion resistance.

In view of the above-mentioned characteristics, the conjugated diene rubber of the present invention has wide applications, which include, for example, tire parts such as tread, carcass, side-wall, inner liner and bead, and rubber articles such as hoses, window frames, belts, shoe soles, vibration insulating rubber, and automobile parts. Further, the conjugated diene rubber can be used as a reinforcing material to be incorporated in high-impact polystyrene and ABS resin. The conjugated diene rubber is especially suitable as a material for tread of a low-fuel consumption tire.

The invention claimed is:

1. A conjugated diene rubber containing at least 5% by weight of a structure comprising at least three conjugated diene polymer chains bonded through a polyorganosiloxane.

2. The conjugated diene rubber according to claim 1, wherein the conjugated diene polymer chains comprise 50 to 100% by weight of conjugated diene monomer units and 50 to 0% by weight of aromatic vinyl monomer units.

3. The conjugated diene rubber according to claim 1, wherein the conjugated diene polymer chains comprise 40 to 99.9% by weight of 1,3-butadiene units, 0.1 to 10% by weight of isoprene units and 0 to 50% by weight of aromatic vinyl monomer units.

4. The conjugated diene rubber according to claim 2, wherein the conjugated diene monomer units have a vinyl bond content in the range of 10 to 95% by weight.

5. The conjugated diene rubber according to claim 1, wherein the polyorganosiloxane has 5 to 200 functional groups in the molecule which are capable of reacting with an active metal bonded to a terminal of each active conjugated diene polymer chain.

6. The conjugated diene rubber according to claim 1, wherein the conjugated diene polymer chains are bonded through a polyorganosiloxane represented by the following general formula (1):

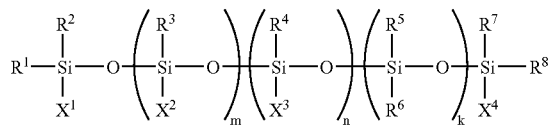

wherein $R^1$ through $R^8$ represent an alkyl group having 1 to 6 carbon atoms or an aryl group having 6 to 12 carbon atoms, and $R^1$ through $R^8$ may be the same or different; $X^1$ and $X^4$ are either (i) such that a part of the plural $X^1$ and a part of the plural $X^4$ are a group selected from alkoxyl groups having 1 to 5 carbon atoms, hydrocarbon groups containing a 2-pyrrolidonyl group, and groups with 4 to 12 carbon atoms containing an epoxy group, and the remainder of the plural $X^1$ and the remainder of the plural $X^4$ are a group derived from these groups or are a single bond, or (ii) an alkyl group having 1 to 6 carbon atoms or an aryl group having 6 to 12 carbon atoms, and $X^1$ and $X^4$ may be the same or different; $X^2$ is a group such that a part of the plural $X^2$ is a group selected from alkoxyl groups having 1 to 5 carbon atoms, hydrocarbon groups containing a 2-pyrrolidonyl group, and groups with 4 to 12 carbon atoms containing an epoxy group, and the remainder of the plural $X^2$ is a group derived from these groups or is a single bond; $X^3$ is a group comprising 2 to 20 alkylene glycol repeating units; and m is an integer in the range of 3 to 200, n is an integer in the range of 0 to 200, and k is an integer in the range of 0 to 200.

7. The conjugated diene rubber according to claim 1, wherein the conjugated diene polymer chains are bonded through a polyorganosiloxane represented by the following general formula (3):

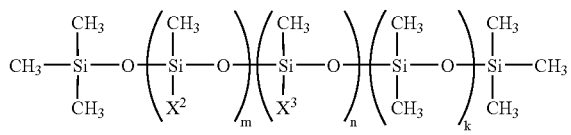

wherein $X^2$ is a group selected from alkoxyl groups having 1 to 5 carbon atoms, hydrocarbon groups containing a 2-pyrrolidonyl group, and groups with 4 to 12 carbon atoms containing an epoxy group; $X^3$ is a group comprising 2 to 20 alkylene glycol repeating units; and m is an integer in the range of 5 to 200, n is an integer in the range of 0 to 200, and k is an integer in the range of 0 to 200.

8. The conjugated diene rubber according to claim 1, wherein the conjugated diene polymer chains are bonded through a polyorganosiloxane represented by the following general formula (4):

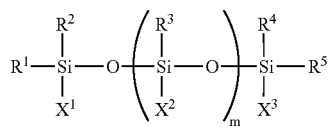

wherein $R^1$ through $R^5$ represent an alkyl group having 1 to 6 carbon atoms or an aryl group having 6 to 12 carbon atoms, and $R^1$ through $R^5$ may be the same or different; $X^1$ through $X^3$ are a group selected from alkoxyl groups having 1 to 5 carbon atoms, hydrocarbon groups containing a 2-pyrrolidonyl group, groups with 4 to 12 carbon atoms containing an epoxy group, and groups Q derived from these groups, and a part of $X^1$ through $X^3$ is the group Q, and $X^1$ through $X^3$ may be the same or different; and m is an integer in the range of 3 to 200.

9. A rubber composition comprising the conjugated diene rubber as claimed in claim 1.

10. The rubber composition according to claim 9, which further comprises silica.

11. A process for producing a conjugated diene rubber as claimed in claim 1, characterized in that active conjugated diene polymer chains each having an active metal at a polymer chain terminal, which have been obtained by polymerizing a conjugated diene monomer alone, or a conjugated diene monomer and an aromatic vinyl monomer with the aid of an organic active metal in an inert solvent, are allowed to react with a polyorganosiloxane having 5 to 200 functional groups in the molecule which are capable of reacting with the active metal bonded to a terminal of each active conjugated diene polymer chain, wherein the amount of the polyorganosiloxane is larger than 0.00 1 mole but smaller than 0.1 mole, per mole of the organic active metal used in the polymerization.

12. The process for producing a conjugated diene rubber according to claim 11, wherein the active conjugated diene polymer chains have been obtained by polymerizing a monomer composition comprising 50 to 100% by weight of a conjugated diene monomer and 50 to 0% by weight of an aromatic vinyl monomer.

13. The process for producing a conjugated diene rubber according to claim 11, wherein the active conjugated diene polymer chains have been obtained by polymerizing a monomer composition comprising 40 to 99.9% by weight of 1,3-butadiene, 0.1 to 10% by weight of isoprene and 0 to 50% by weight of an aromatic vinyl monomer.

14. The process for producing a conjugated diene rubber according to claim 13, wherein the active conjugated diene polymer chains have been obtained by a polymerization procedure wherein polymerization is carried out with the aid of an organic active metal in an inert solvent by the steps of:

polymerizing a monomer mixture comprising at least 80% by weight of the amount of 1,3-butadiene used for polymerization, not larger than 80% by weight of the amount of isoprene used for polymerization, and at least 80% by weight of the amount of the optional aromatic vinyl monomer used for polymerization;

adding the remainder of the amount of isoprene, followed by polymerization; and then, adding the remainder of the amount of 1,3-butadiene and the remainder of the amount of the optional aromatic vinyl monomer, followed by polymerization.

15. The process for producing a conjugated diene rubber according to claim 11, wherein the polyorganosiloxane is represented by the following general formula (2): wherein $R^9$ through $R^{16}$ represent an alkyl group having 1 to 6 carbon atoms or an aryl group having 6 to 12 carbon atoms, and $R^9$ through $R^{16}$ may be the same or different; $X^5$ and $X^8$ are a group selected from alkoxyl groups having 1 to 5 carbon atoms, hydrocarbon groups containing a 2-pyrrolidonyl group, and groups with 4 to 12 carbon atoms containing an epoxy group, and $X^5$ and $X^8$ maybe the same or different; $X^6$ is a group selected from alkoxyl groups having 1 to 5 carbon atoms, hydrocarbon groups containing a 2-pyrrolidonyl group, and groups with 4 to 12 carbon atoms containing an epoxy group; $X^7$ is a group comprising 2 to 20 alkylene glycol repeating units; and m is an integer in the range of 3 to 200, n is an integer in the range of 0 to 200, and k is an integer in the range of 0 to 200.

16. The process for producing a conjugated diene rubber according to claim 11, wherein the polyorganosiloxane is represented by the following general formula (3):

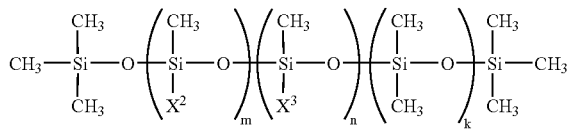

wherein $X^2$ is a group selected from alkoxyl groups having 1 to 5 carbon atoms, hydrocarbon groups containing a 2-pyrrolidonyl group, and groups with 4 to 12 carbon atoms containing an epoxy group; $X^3$ is a group comprising 2 to 20 alkylene glycol repeating units; and m is an integer in the range of 5 to 200, n is an integer in the range of 0 to 200, and k is an integer in the range of 0 to 200.

17. The process for producing a conjugated diene rubber according to claim 11, wherein the polyorganosiloxane is represented by the following general formula (5):

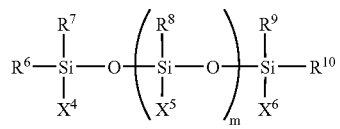

wherein $R^6$ through $R^{10}$ represent an alkyl group having 1 to 6 carbon atoms or an aryl group having 6 to 12 carbon atoms, and $R^6$ through $R^{10}$ may be the same or different; $X^4$ through $X^6$ are a group selected from alkoxyl groups having 1 to 5 carbon atoms, hydrocarbon groups containing a 2-pyrrolidonyl group, groups with 4 to 12 carbon atoms containing an epoxy group, and $X^4$ through $X^6$ may be the same or different; and m is an integer in the range of 3 to 200.

18. The process for producing a conjugated diene rubber according to claim 11, wherein the functional groups, which are capable of reacting with an active metal bonded to a terminal of each active conjugated diene polymer chain, are epoxy groups.

* * * * *